(12) United States Patent
Bonitz et al.

(10) Patent No.: US 11,748,220 B2
(45) Date of Patent: Sep. 5, 2023

(54) TRANSMISSION LINK TESTING

(71) Applicant: Micron Technology, Inc., Boise, ID (US)

(72) Inventors: Rainer F. Bonitz, Bruckmühl (DE); Binbin Huo, Sauerlach (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/529,775

(22) Filed: Nov. 18, 2021

(65) Prior Publication Data
US 2022/0164268 A1 May 26, 2022

Related U.S. Application Data

(60) Provisional application No. 63/116,687, filed on Nov. 20, 2020.

(51) Int. Cl.
| | |
|---|---|
| *G06F 11/07* | (2006.01) |
| *G06F 11/26* | (2006.01) |
| *G06F 3/06* | (2006.01) |
| *G06F 11/30* | (2006.01) |

(52) U.S. Cl.
CPC ............ *G06F 11/26* (2013.01); *G06F 3/0619* (2013.01); *G06F 3/0659* (2013.01); *G06F 3/0679* (2013.01); *G06F 11/0757* (2013.01); *G06F 11/0772* (2013.01); *G06F 11/3034* (2013.01)

(58) Field of Classification Search
CPC .. G06F 11/26; G06F 11/0757; G06F 11/0772; G06F 11/3034
See application file for complete search history.

(56) References Cited

U.S. PATENT DOCUMENTS

| | | | | |
|---|---|---|---|---|
| 4,352,103 | A * | 9/1982 | Slater | G05B 19/0428 714/749 |
| 9,870,283 | B2 * | 1/2018 | Shaeffer | G06F 11/1004 |
| 2001/0023392 | A1 * | 9/2001 | Nakatsuhama | G06F 11/0757 702/120 |
| 2010/0005366 | A1 * | 1/2010 | Dell | G11C 29/70 714/764 |
| 2014/0136915 | A1 | 5/2014 | Hyde et al. | |
| 2017/0279700 | A1 | 9/2017 | Cai | |

(Continued)

FOREIGN PATENT DOCUMENTS

EP 1909180 4/2008

OTHER PUBLICATIONS

Invitation to Pay Extra Fees and Partial Search Report from related PCT Application No. PCT/US2021/059901, dated Apr. 7, 2022, 21 pages.

(Continued)

*Primary Examiner* — Nadeem Iqbal
(74) *Attorney, Agent, or Firm* — Brooks, Cameron & Huebsch, PLLC (57) ABSTRACT

A computing system can comprise a processing resource and a memory device coupled together via a first transmission link. The processing resource can be configured to test the first transmission link in response to the memory device failing to execute a command by sending the command to the memory device again for retry and monitoring the first transmission link for signals that indicate whether the command was executed by the memory device.

27 Claims, 6 Drawing Sheets

(56) References Cited

U.S. PATENT DOCUMENTS

2019/0007288 A1   1/2019  Wen
2020/0089586 A1   3/2020  Wong
2020/0218599 A1   7/2020  Elliott

OTHER PUBLICATIONS

International Search Report and Written Opinion from related PCT Application No. PCT/US2021/059901, dated May 31, 2022, 25 pages.
Anonymous: "memory—Disable through the BIOS a faulty RAM module or make the BIOS emulate an Error Correction Code when the RAM itself has none?—Super User", Apr. 30, 2020 (Apr. 30, 2020), pp. 1-3, XP055902406, Retrieved from the Internet: URL: https://superuser.com/questions/1547345/disable-through-the-bios-a-faulty-ram-module-or-make-the-bios-emulate-an-error-c [retrieved on Mar. 17, 2022] p. 1.

* cited by examiner

TRANSMISSION LINK TESTING

PRIORITY INFORMATION

This application is a Non-Provisional application of U.S. Provisional application No. 63/116,687, filed Nov. 20, 2020, the contents of which are herein incorporated by reference.

TECHNICAL FIELD

Embodiments of the disclosure relate generally to computing systems, and more specifically, relate to testing transmission links on computing systems.

BACKGROUND

A computing system can include a number of memory devices, a number of modules including integrated circuits, a number of sensors, and/or a number of processing resources configured to perform computing operations. The computing system can be part of a system, such as an autonomous driving system of an automobile and/or a control system in an industrial application. Testing the reliability of the transmission links of the computing system that is part of an automobile and/or control system can be an important part of ensuring the automobile and/or control system can properly function.

BRIEF DESCRIPTION OF THE DRAWINGS

The present disclosure will be understood more fully from the detailed description given below and from the accompanying drawings of various embodiments of the disclosure.

DETAILED DESCRIPTION

Various embodiments of the present disclosure are directed to computing system for testing transmission links that couple components of the computing system together. The computing system can include transmission links (e.g., buses) that transfer signals and/or data between the components of the computing system. Examples of components of the computing are described below in conjunction with FIG. 1.

A computing system can be implemented on a printed circuitry board (PCB). The computing system can be tested during production and/or when in the field to determine functionality of the computing system. The transmission links that couple the components of the computing system together can be tested by monitoring components of the computing system for commands that are retried (e.g., sent and/or performed again by components of the computing system in response to the command failing during a prior performance of the command). The retry of commands can indicate that transmission links of the computing system are not reliable and that signals and/or data are not being properly transmitted on the transmission links between components of the computing system when performing the command.

A processing resource can be configured to execute instructions, stored on a machine-readable storage medium of the computing system, to detect command retries, count a number of retries of a command, send a retry command indicator, and/or initiate an action (e.g., disable transmission link) in response to detecting a command retry.

Also, a processing resource can be configured to execute instructions, stored on a machine-readable storage medium of the computing system, to send an error injection command to a component of the computing system. It can be difficult to trigger a retry event in the real world, therefore during testing of the transmission links, it can be useful to manually inject an error on the data transmission path (e.g., transmission links). The error injection command can trigger retry or system recovery handler to test the overall stability of the system and immune capability of the error to determine if the system can recover from the error to operate in a normal state. The error injection command can be configured to simulate any kind of error, including software errors and storage device level errors, for example. The error injection command can be used during testing of the computing system to evaluate how the computing system will operate when performing commands that result in errors. The error injection commands can be performed by components of the computing system and the processing resource can be configured to monitor the transmission links for signals and data that indicate whether or not the transmission links are reliable when performing the error injection commands that result in errors.

When operating in the error injection command mode, a retry message/retried command can monitor lower-level driver behavior and enable a command retry reminding mechanism. The command retry reminding mechanism can be implemented by means of physical hardware alarm intermedia, such as LED flash and warning buzzer. Once the lower lever driver (LLD) detects that the host driver software pushed a failed command to retry, LLD can raise a signal to the general purpose input/output (GPIO) module, and let GPIO module output a formatted electrical signal to an LED light or buzzer, such makes it easy for the outside world to observe the retransmission events. The command retry reminding mechanism can be implemented by software signal, such as a warning print, and kernel signal handler. Once the LLD detects that a failed command will be retried, a warning print or a kernel signal will be issued by the LLD, the user space application will detect this message (e.g., the message or signal has the pre-defined formant). Based on this message, the use space testing application can adjust its testing mode.

A memory device can include a retry detection module that includes hardware and/or that is configured to execute instructions on a machine-readable storage medium of the computing system to detect command retries, count a number of retries of a command, send a retry command indicator, and/or initiate an action (e.g., disable transmission link) in response to detecting a command retry.

In response to a count of the number of retries being at or above a threshold and/or determining that a transmission link is unreliable, the system safety and availability can be modified by the processing resource reading the status register that was programed by the retry detection module to execute a service routine that can retune the transmission links. In response to a count of the number of retries being at or above a threshold and/or determining that a transmission link is unreliable, the transmission link speed can be decreased (e.g., in a safe mode). In response to a count of the number of retries being at or above a threshold and/or determining that a transmission link is unreliable, one more transmission links can be disabled and the system can be reconfigured to operate with the remaining transmission links that are not disabled and the respective components that are coupled to the remaining transmission links. In response to a count of the number of retries being at or above a threshold and/or determining that a transmission link is unreliable, new configuration settings can be written to the configuration register for the retry detection module. In response to a count of the number of retries being at or above a threshold and/or determining that a transmission link is unreliable, the computing system can enter an emergency or safe mode to avoid a crash and/o reboot of the operating system.

Various embodiments of the present disclosure can include a computing system comprising a processing resource and a memory device. The memory device can be coupled to the processing resource via a first transmission link. The processing resource can be configured to test the first transmission link in response to the memory device failing to execute a command by sending the command to the memory device again for retry and monitoring the first transmission link for signals that indicate whether the command was executed by the memory device.

The processing device can be configured to determine a count of a number of times that the command is sent to the memory device for retry. The processing device can be configured to issue a retry message in response to the command being sent to the memory device again. The retry message can be stored as a record of needing to retry a needing. The computing system can be configured to take an action and/or further monitor the transmission links of the computing system based on the retry messages that are stored by the computing system. The processing resource can be configured to determine if the first transmission link is reliable in response to sending the command to the memory device again.

The processing resource can be configured to issue an error injection command that results in the memory device returning an error signal when executing the error injection command. The processing resource can be configured to issue a retry message and send the error injection command to the memory device again in response to receiving the error signal. The processing resource can be configured to monitor the first transmission link for signals that indicate if the first transmission link is reliable.

The computing system can include an integrated circuit. The integrated circuit can be coupled to the processing resource via a second transmission link and wherein the processing resource is configured to test the second transmission link in response to the integrated circuit failing to execute a command by sending the command to the integrated circuit again and monitoring the second transmission link for signals that indicate whether the command was executed by the integrated circuit.

Various embodiments for testing transmission links can include receiving, at a processing resource, a signal from a memory device on a transmission link that couples the memory device to the processing resource. The signal can indicate that memory device failed to execute a command. In response to receiving the signal, the processing the resource can send the command to the memory device for the memory device to retry the command. In response to the memory device retrying the command, the processing resource can monitor the transmission link for signals that indicate whether the command was executed by the memory device.

The processing resource can issue a retry message in response to the command being sent to the memory device again, determine a count of a number of times that the command is sent to the memory device for retry, determining the transmission link is reliable in response to receiving signals that indicate the command was executed by the memory device, and determining the transmission link is unreliable in response to receiving a threshold number of signals that indicate the memory device failed to execute the command when retried by the memory device. The processing resource can disable access to the memory device in response to determining the transmission link is unreliable.

Various embodiments of the present disclosure can include a computing system comprising a processing resource and a memory device, wherein the memory device is coupled to the processing resource via a transmission link and wherein the memory device can be configured to detect that a command has been sent to the memory device by the processing resource more than once and determine a count of a number of times that the command has been sent to the memory device.

The memory device can be configured to determine the transmission link is unreliable in response to the command being sent to the memory device a threshold number of times. The memory device can be configured to determine the transmission link is reliable in response to the command being sent to the memory device less than a threshold number of times. The memory device can be configured to send a signal to the processing resource in response to determining the transmission link is unreliable. The processing resource can be configured to perform a service routine in response to receiving the signal. The system can be configured to enter a safe mode in response to failing the service routine. The system can be configured to continue normal operation in response to passing the service routine.

The memory device can be configured to determine that the command has been sent to the memory device by the processing resource more than once in response to receiving a request for a portion of data more than once in a particular period of time.

Various embodiments of the present disclosure can include detecting that a command has been sent to a memory device by a processing resource more than once on a transmission link that coupled the memory device to the processing resource, determining a count of a number of times that the command has been sent to the memory device, determining the transmission link is unreliable in response to the command being sent to the memory device a threshold number of times, and determining the transmission link is reliable in response to the command being sent to the memory device less than a threshold number of times.

The operation speed on the transmission link can be decreased in response to determining the transmission link is unreliable. The transmission link can be disabled in response to determining the transmission link is unreliable and the system can be reconfigured to operate without the memory device coupled to the processing resource via the disabled transmission link. The transmission link can be retuned in response to determining the transmission link is unreliable. The count of the number of times that the command has been sent to the memory device can be stored in a register on the memory device.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 408 in FIG. 4. Analogous elements within a figure may be referenced with a hyphen and extra numeral or letter. See, for example, elements 104-1, 104-2 in FIG. 1. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
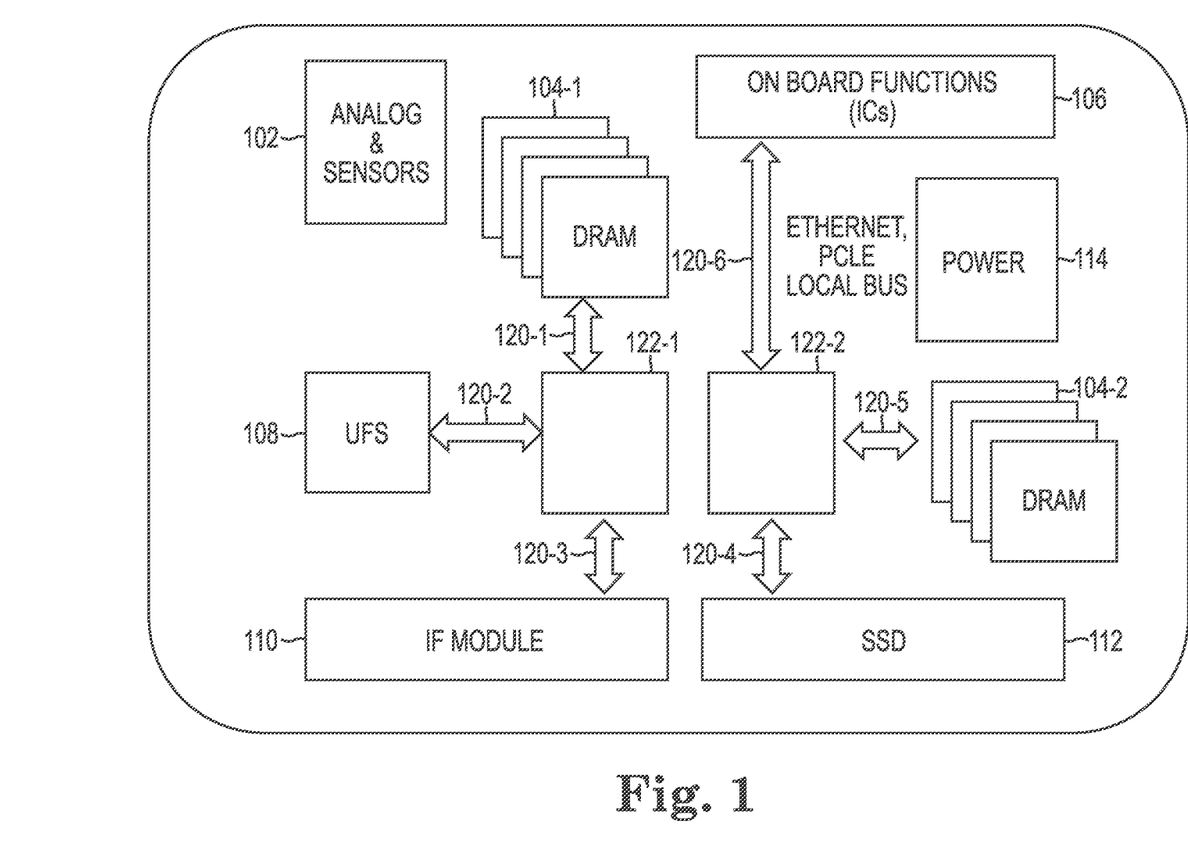
FIG. 1 illustrates an example computing system that includes a number of transmission links in accordance with some embodiments of the present disclosure.

FIG. 1 illustrates an example computing system that includes a number of transmission links in accordance with some embodiments of the present disclosure. The computing system can include processing resource 122-1 that is coupled to memory devices 104-1 (e.g., DRAM memory devices) via transmission link 120-1 and processing resource 122-2 that is coupled to memory devices 104-2 (e.g., DRAM memory devices) via transmission link 120-5. The computing system can include processing resource 122-1 that is coupled to memory device 108 (e.g., Flash memory device) via transmission link 120-2. The computing system can include processing resource 122-2 that is coupled to module 106 (e.g., integrated circuitry) via transmission link 120-6. The computing system can include processing resource 122-2 that is coupled to memory device 112 (e.g., SSD memory device) via transmission link 120-4. The computing system can include processing resource 122-1 that is coupled to interface module 110 (e.g., external interface integrated circuitry, which can include an LLD and an GPIO for a computing system) via transmission link 120-3. Interface module 110 can couple to the computing system to other computing systems, memory devices, and/or components. The computing system can also include power source 114 and sensor and analog components 102, which can be coupled to the components of the computing system to provide power from power source 114 and inputs from sensor analog components 102. The components of the computing system can be configured to transfer signals and/or data on the transmission links 120-1, . . . , 120-6. Transmission links 120-1, . . . , 120-6 can be directional buses that transfer signals and/or data between components of the computing system.

Figure 2:
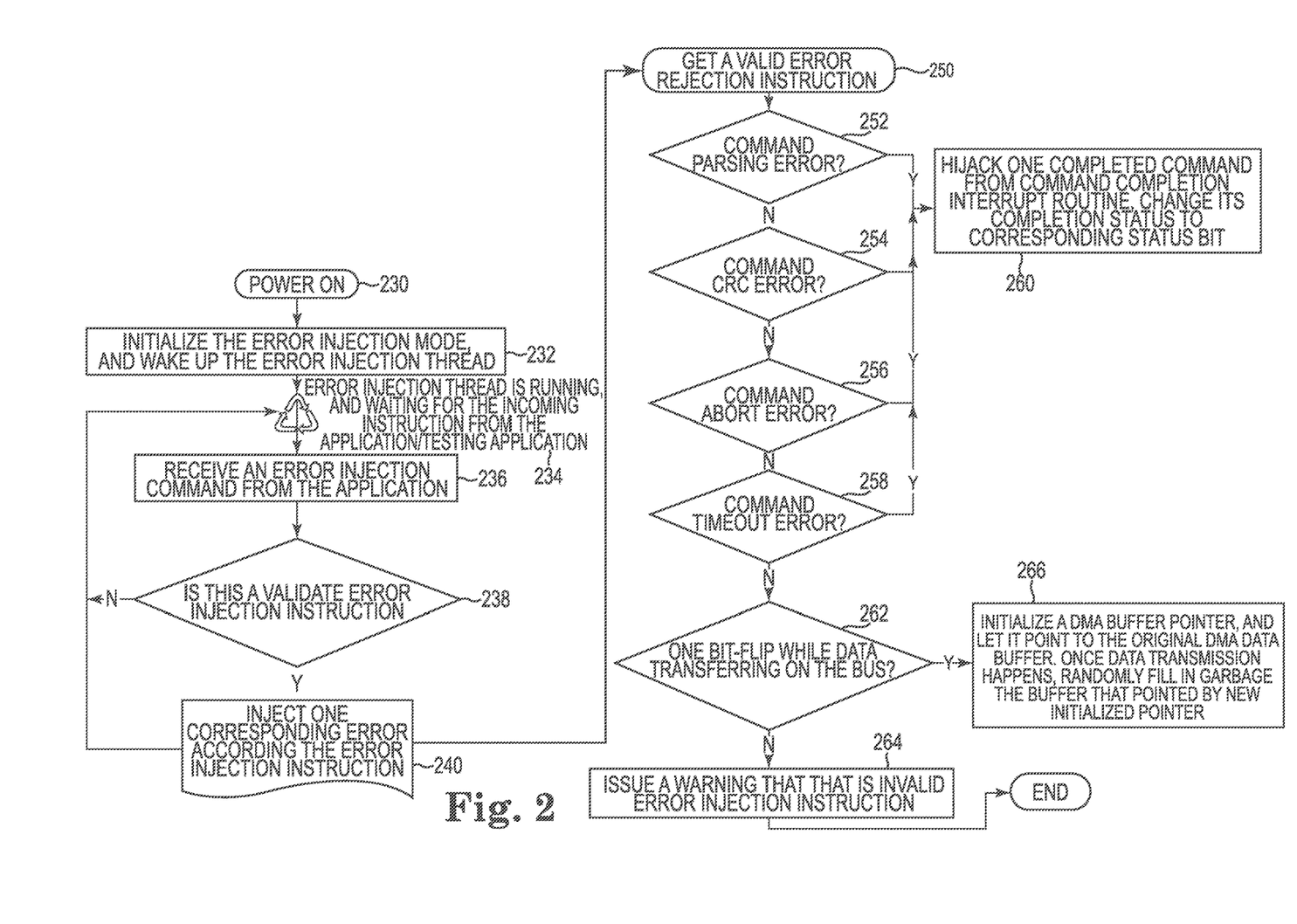
FIG. 2 is a method flow diagram of an example method for testing transmission links with error injection commands in accordance with some embodiments of the present disclosure.

FIG. 2 is a method flow diagram of an example method for testing transmission links with error injection commands in accordance with some embodiments of the present disclosure. The method of FIG. 2 can include powering on the computing system 230. The error injection mode 232 can be initialized and wake up the error injection thread that is waiting for an error injection command from an application running the error injection mode 234. The error injection command can be received from the application 236. And a determination regarding whether the error injection command is valid 238 can be made. If the error injection command is valid, the error injection command is sent to a component of the computing system 240. The error injection command can be sent to a component of the computing system by injecting one corresponding error according to the error injection instruction. If the error injection command is not valid, another error injection command is generated. The component of the computing system receives the error injection command 250. A determination regarding type and status of the error injection command can be made. For example, if the error injection command results in a parsing error 252, CRC error 254, abort error 256, and/or timeout error 258, the command completion interrupt routine is modified to change the completion status for the error injection command to the corresponding status. If the error injection command results in a bit flip 262, a DMA data transfer can be initialized and the DMA buffer can be filled with garbage to indicate the error injection command resulted in an error 266. If the error injection command does not result in an error or a bit flit, an indication is provided that the error injection command is not valid 264. When the computing system is in a test mode, the processing resource can be configured to cause components of a computing system to produce a particular error. For example, a host and/or processing resource can send commands to an interface of the computing system that produces an error on the interface and/or other components of the computing system.

Figure 3:
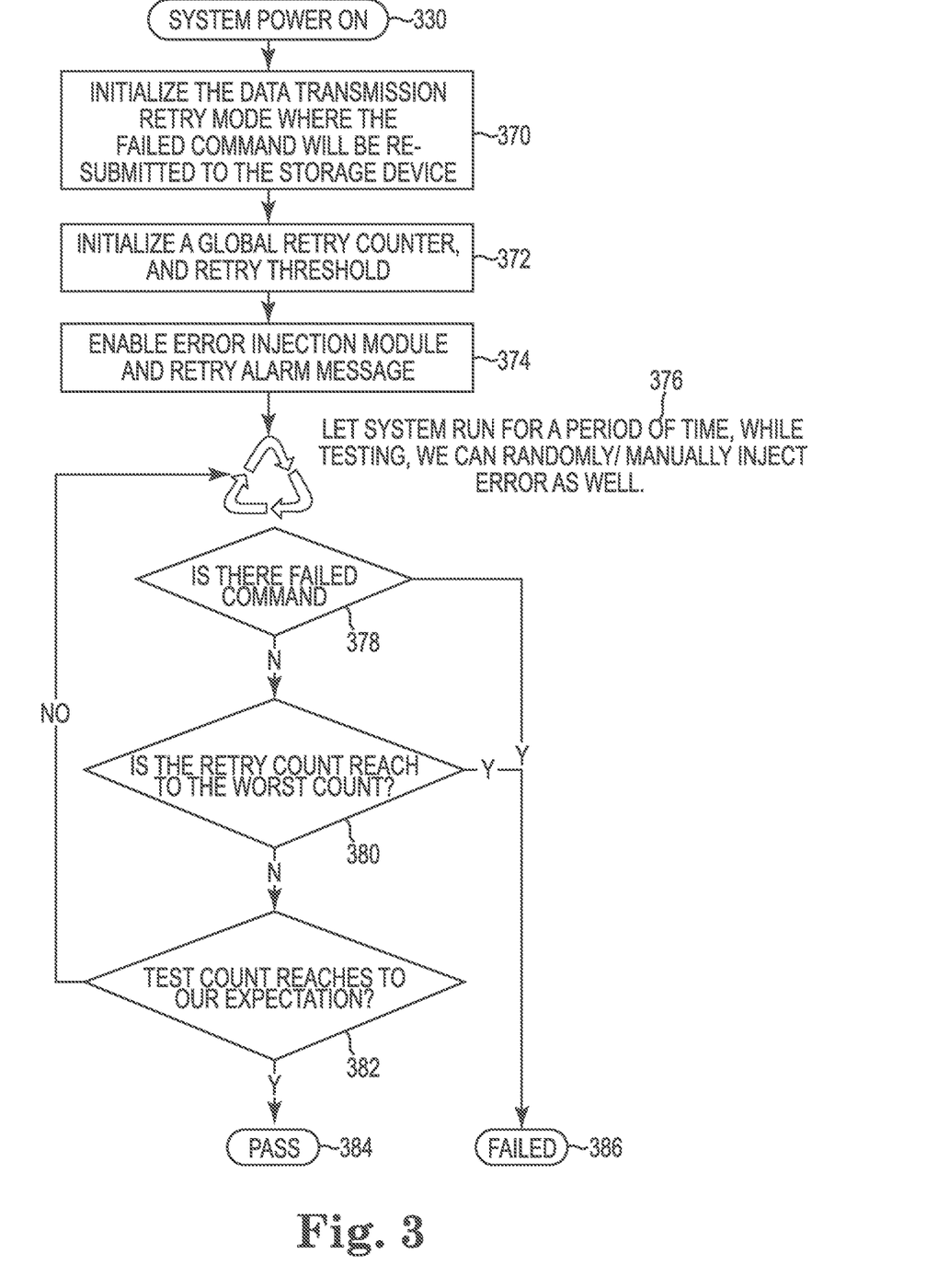
FIG. 3 is a method flow diagram of an example method for testing transmission links with command retry counting in accordance with some embodiments of the present disclosure.

FIG. 3 is a method flow diagram of an example method for testing transmission links with command retry counting in accordance with some embodiments of the present disclosure. The method of FIG. 3 can include powering on the computing system 330. The retry mode 370 can be initialized to resend commands that have failed for a retry and the status of the retries can be monitored to determine the reliability of the transmission link that transfers signals and/or data associated with the command that is retried. The retry mode can include failed commands being resubmitted to the storage device. A counter can be enabled to determine the number of times a command is retried and a retry threshold can be set 372. The retry threshold can be a retry count that is reached to indicate the command is a failure. The error injection mode 374 can be enabled. The computing system can be operated for a period of time 376. The error injection mode can inject errors, also errors can randomly and/or manually be injected while operating the error injection mode. While the error injection mode is injecting errors read and/or write commands can be issued. The read and/or write commands can be issued with interruption to cause the memory device to be busy. A determination can be made regarding whether a command failed 378. If there is a failed command and/or a threshold number of commands have failed after being retried 380, a determination that the transmission link is unreliable can be made 386. If there is not a failed command, less than a threshold number of commands that have failed, and/or a threshold number of commands that have passed, a determination that the transmission link is reliable can be made 384.

Figure 4:
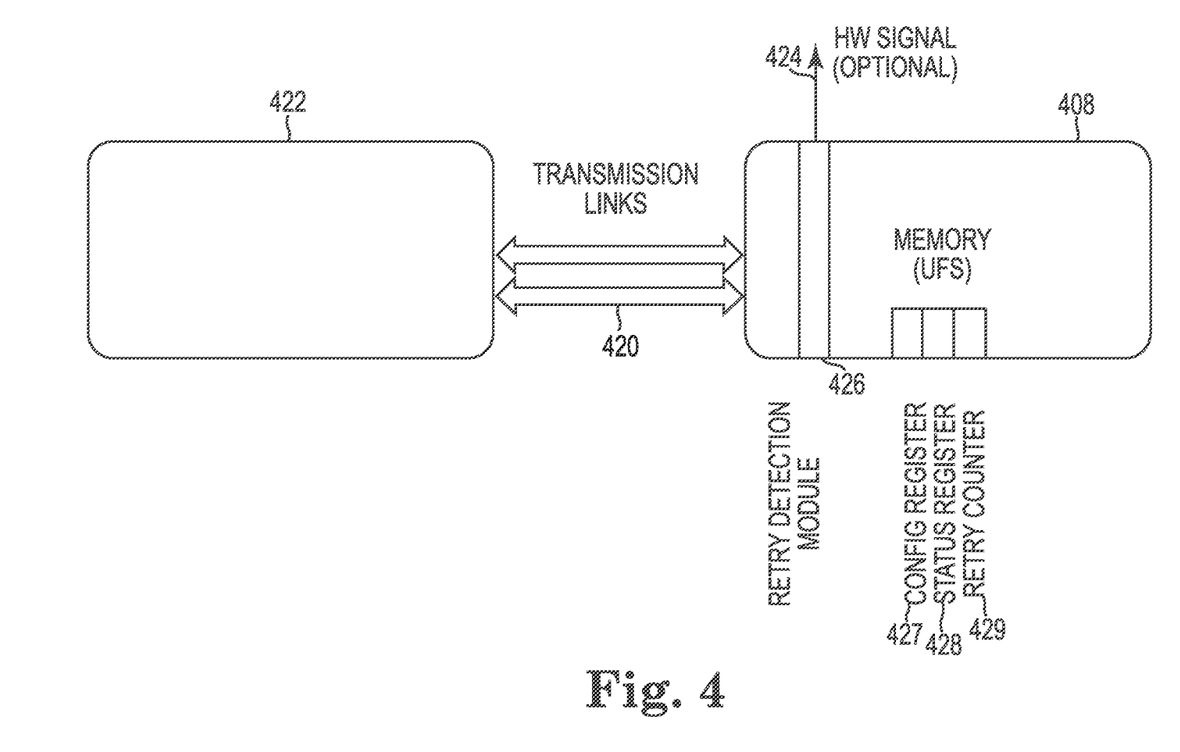
FIG. 4 is a block diagram of a memory device in a computing system configured in accordance with some embodiments of the present disclosure.

FIG. 4 is a block diagram of a memory device in a computing system configured in accordance with some embodiments of the present disclosure. Memory device 408 can include retry detection module 426 (e.g., hardware, firmware, and or software) configured to detect when a command is retried. The retry detection module 426 can detect a retry when a portion of data is requested again (e.g., a second, third, fourth time, etc.) in a particular time period. The retry detection module 426 can receive operation instructions from processing resource 422 via transmission links 420. Memory device 408 can include configuration register 427 that provides instructions to the retry detection module 426 regarding the signals that are monitored to detect a retry. Memory device 408 can include status register 428 that can store status information of commands performed by the memory device 408. The retry detection module 426 can store command status information in status register 428 and/or obtain command status information from status register and, in response to storing or obtaining command status information, send a command and/or retry command to a processing resource. Memory device 408 can include retry counter 429 that can store a count of a number of times that a command is retried. The retry detection module 426 can be configured with a threshold number of retries for a command and when the retry counter 429 reaches the threshold, the retry detection module 426 can send a signal to the processing resource 422 indicating that an action should be taken, such as disabling the transmission link and/or entering a safe mode, for example. When the processing resource 422 sends the command to the memory device again (e.g., a retry command), the command descriptor can include a retry flag that allows the memory device to differentiate between retry command and other commands.

Figure 5:
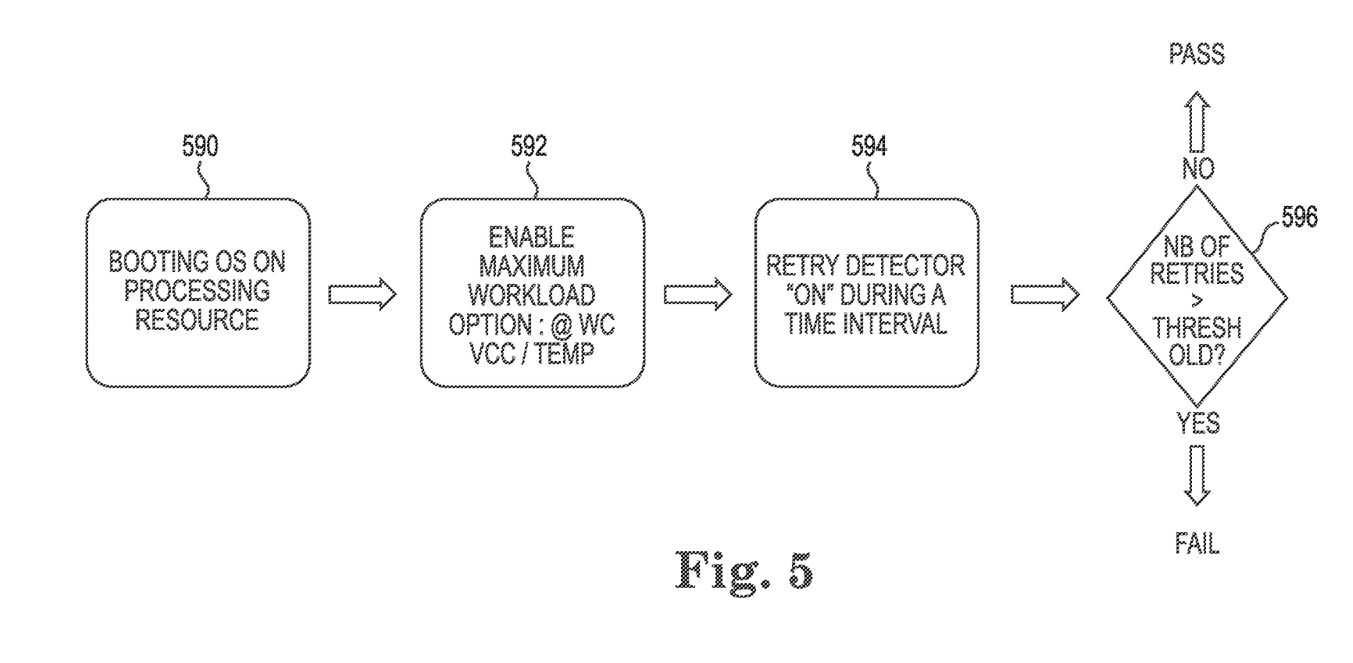
FIG. 5 is a method flow diagram of an example method for testing transmission links with a memory device configured to detect command retries in accordance with some embodiments of the present disclosure.

FIG. 5 is a method flow diagram of an example method for testing transmission links with a memory device configured to detect command retries in accordance with some embodiments of the present disclosure. The method includes booting the operating system on the processing resource 590. The computing system can operate a memory device with a retry detection module at maximum workload (e.g., based on threshold voltages and/or temperature, for example) 592. The retry detector can be on during a timer interval while the processing resource is sending commands to the memory device. The commands can include a command descriptor that can include a retry flag to indicate to the memory device and/or retry detection module that the command is a retry command. The retry detection module can determine a count of a number of retries of a command 596. If the count is at or above the threshold, the transmission link that couples the processing resource to the memory is determined to be unreliable. If the count is below the threshold, the transmission link that couples the processing resource to the memory is determined to be reliable.

Figure 6:
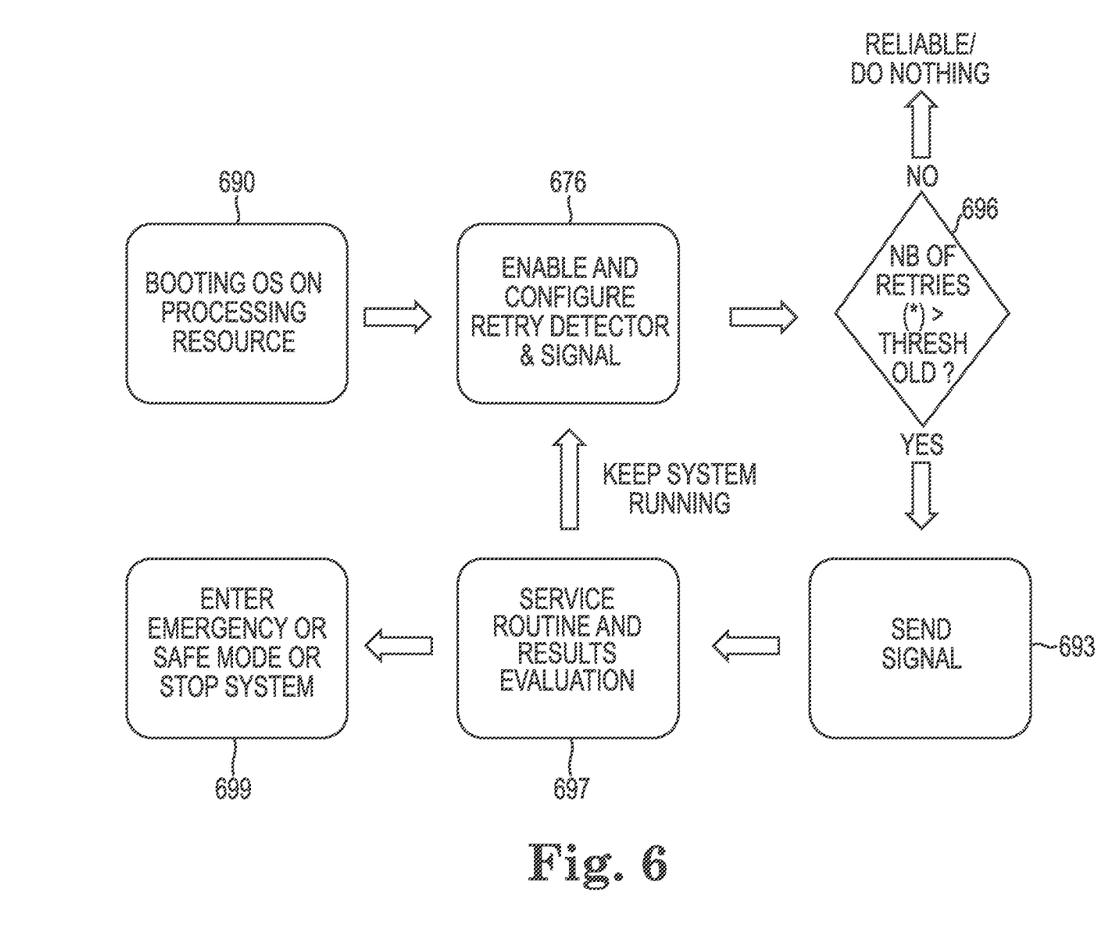
FIG. 6 is a method flow diagram of an example method for testing transmission links with service routines in accordance with some embodiments of the present disclosure.

FIG. 6 is a method flow diagram of an example method for testing transmission links with service routines in accordance with some embodiments of the present disclosure. The method includes booting the operating system on the processing resource 690. The computing system can enable a retry detection module, including a signal, on a memory device 676. The retry detection module can determine a count of a number of retries of a command 696. The count of the number of retries can be per a particular time period, for example number of retries per minute. If the count is at or above the threshold, the retry detection module can send a signal to the processing resource 693 and the processing resource can perform a service routine 697. If the service routine is passed and/or successful, the computing system can continue to operate normally. If the service routine is not passed and/or unsuccessful, the computing system can enter a safe and/or emergency mode 699 to operate with reduced functionality (e.g., slower speeds and/or certain components of the computing system can be disabled or operated on a limited basis, for example) or the system can be stopped. If the count is below the threshold, the transmission link that couples the processing resource to the memory is determined to be reliable.

The term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disks including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
   a processing resource; and
   a memory device, wherein the memory device is coupled to the processing resource via a first transmission link and wherein the processing resource is configured to test the first transmission link in response to detecting the memory device failing to execute a command by sending the command to the memory device again as a retry command and monitoring the first transmission link for one or more signals that indicate whether the retry command was executed by the memory device, and wherein a command descriptor for the retry command includes a retry flag that allows the memory device to differentiate between the retry command and the command.

2. The system of claim 1, wherein the processing device is configured to determine a count of a number of times that the command is sent to the memory device for retry.

3. The system of claim 1, wherein the processing device is configured to issue a retry message in response to the command being sent to the memory device again.

4. The system of claim 1, wherein the processing resource is configured to determine if the first transmission link is reliable in response to sending the command to the memory device again.

5. The system of claim 1, wherein the processing resource is configured to issue an error injection command to the memory device that results in the memory device returning an error signal when executing the error injection command.

6. The system of claim 5, wherein the processing resource is configured to issue a retry message and send the error injection command to the memory device again in response to receiving the error signal.

7. The system of claim 6, wherein the processing resource is configured to monitor the first transmission link for signals that indicate if the first transmission link is reliable.

8. The system of claim 1, further comprising an integrated circuit, wherein the integrated circuit is coupled to the processing resource via a second transmission link and wherein the processing resource is configured to test the second transmission link in response to the integrated circuit failing to execute a command by sending the command to the integrated circuitry again and monitoring the second transmission link for signals that indicate whether the command was executed by the integrated circuit.

9. A method, comprising:
   receiving, at a processing resource, a signal from a memory device on a transmission link that couples the memory device to the processing resource, wherein the signal indicates that memory device failed to execute a command;
   sending, by the processing the resource, the command to the memory device as a retry command for the memory device to retry the command in response to receiving the signal, wherein a command descriptor for the retry command includes a retry flag that allows the memory device to differentiate between the retry command and the command; and
   monitoring the transmission link for signals that indicate whether the command was executed by the memory device in response to the memory device retrying the command.

10. The method of claim 9, further including issuing a retry message in response to the command being sent to the memory device again.

11. The method of claim 9, determining a count of a number of times that the command is sent to the memory device for retry.

12. The method of claim 9, further including determining the transmission link is reliable in response to receiving signals that indicate the command was executed by the memory device.

13. The method of claim 9, further including determining the transmission link is unreliable in response to receiving a threshold number of signals that indicate the memory device failed to execute the command when retried by the memory device.

14. The method of claim 13, further includes disabling access to the memory device in response to determining the transmission link is unreliable.

15. A system, comprising:
    a processing resource; and
    a memory device, wherein the memory device is coupled to the processing resource via a transmission link and wherein the memory device is configured to detect that a command has been sent to the memory device by the processing resource more than once and determine a count of a number of times that the command has been sent to the memory device as a retry command, and wherein a command descriptor for the retry command includes a retry flag that allows the memory device to differentiate between the retry command and the command that was first sent to the memory device.

16. The system of claim 15, wherein the memory device is configured to determine the transmission link is unreliable in response to the command being sent to the memory device a threshold number of times.

17. The system of claim 15, wherein the memory device is configured to determine the transmission link is reliable in response to the command being sent to the memory device less than a threshold number of times.

18. The system of claim 15, wherein the memory device is configured to send a signal to the processing resource in response to determining the transmission link is unreliable.

19. The system of claim 18, wherein the processing resource is configured to perform a service routine in response to receiving the signal.

20. The system of claim 19, wherein the system is configured to enter a safe mode in response to failing the service routine.

21. The system of claim 19, wherein the system is configured to continue normal operation in response to passing the service routine.

22. The system of claim 15, wherein the memory device is configured to determine that the command has been sent to the memory device by the processing resource more than once in response to receiving a request for a portion of data more than once in a particular period of time.

23. A method, comprising:

detecting that a command has been sent as a retry command to a memory device by a processing resource more than once on a transmission link that coupled the memory device to the processing resource, wherein a command descriptor for the retry command includes a retry flag that allows the memory device to differentiate between the retry command and the command that was first sent to the memory device;

determining a count of a number of times that the command has been sent to the memory device;

determining the transmission link is unreliable in response to the command being sent to the memory device a threshold number of times; and determining the transmission link is reliable in response to the command being sent to the memory device less than a threshold number of times.

24. The method of claim 23, further including decreasing an operation speed on the transmission link in response to determining the transmission link is unreliable.

25. The method of claim 23, further including disabling the transmission link in response to determining the transmission link is unreliable and reconfiguring the system to operate without the memory device coupled to the processing resource via the disabled transmission link.

26. The method of claim 23, further including retuning the transmission link in response to determining the transmission link is unreliable.

27. The method of claim 23, further including storing the count of the number of times that the command has been sent to the memory device in a register on the memory device.

* * * * *